US012790947B2

(12) United States Patent
Tranquart et al.

(10) Patent No.: US 12,790,947 B2
(45) Date of Patent: Nov. 10, 2026

(54) VARIABLE PITCH VANE FOR A TURBOMACHINE FAN HAVING A STIFFNESS GRADIENT IN THE ROOT

(71) Applicant: SAFRAN, Paris (FR)

(72) Inventors: Bastien Tranquart, Moissy-Cramayel (FR); Vincent Joudon, Moissy-Cramayel (FR); Vivien Mickaël Courtier, Moissy-Cramayel (FR); Rémi Grenêche, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 19/120,329

(22) PCT Filed: Oct. 12, 2023

(86) PCT No.: PCT/FR2023/051588

§ 371 (c)(1),
(2) Date: Apr. 11, 2025

(87) PCT Pub. No.: WO2024/079426

PCT Pub. Date: Apr. 18, 2024

(65) Prior Publication Data

US 2026/0139601 A1 May 21, 2026

(30) Foreign Application Priority Data

Oct. 14, 2022 (FR) ....................................... 2210618

(51) Int. Cl.
*F01D 5/28* (2006.01)
*B64C 11/06* (2006.01)
(Continued)

(52) U.S. Cl.
CPC .............. *F01D 5/282* (2013.01); *B64C 11/06* (2013.01); *B64C 11/26* (2013.01); *B64D 27/10* (2013.01)

(58) Field of Classification Search
CPC .......... F01D 5/147; F01D 5/282; F01D 5/288; F01D 5/30; F01D 5/3092;
(Continued)

(56) References Cited

U.S. PATENT DOCUMENTS 3,664,764 A 5/1972 Davies et al.
4,260,332 A * 4/1981 Weingart .............. F03D 1/0658 416/226

(Continued)

FOREIGN PATENT DOCUMENTS

WO WO 2006/136755 A2 12/2006
WO WO 2006/136755 A3 6/2007

(Continued)

OTHER PUBLICATIONS

Colliard, "Comparative properties of materials", MetalBlog, Dec. 6, 2021, Retrieved from the Internet: https://metalblog.ctifcom/2021/12/06/proprietes-comparees-des-materiaux/, [retrieved on Jan. 29, 2024], XP093124714.

(Continued)

*Primary Examiner* — Sang K Kim
(74) *Attorney, Agent, or Firm* — Birch, Stewart, Kolasch & Birch, LLP

(57) ABSTRACT

Disclosed is a variable pitch vane for a turbomachine fan comprising a blade (60) and a root (62). The root (62) comprises a bulb (72) and a stalk (74) connecting the bulb (72) to the blade (60), the bulb (72) being connected to the stalk (74) by a neck (82) defining a local minimum of the cross-section of the root (62) along a plane orthogonal to the pitch axis. At least one segment of the root (62) including the neck (82) and at least a portion of the stalk (74) comprises a surface layer and an inner layer between the pitch axis and the surface layer, the inner layer having a stiffness strictly greater than the stiffness of the surface layer.

17 Claims, 11 Drawing Sheets

(51) Int. Cl.
*B64C 11/26* (2006.01)
*B64D 27/10* (2006.01)

(58) Field of Classification Search
CPC ....... F05D 2300/601; F05D 2300/6012; F05D 2300/603; F05D 2300/6031; F05D 2300/6034; F05D 2240/30; F05D 2240/80; B64C 11/26; B64C 2027/47; B64C 11/06; B64D 27/10
See application file for complete search history.

(56) References Cited

U.S. PATENT DOCUMENTS 4,524,499 A 6/1985 Grimes et al.
4,810,167 A * 3/1989 Spoltman .................. B32B 3/18 416/241 A
5,222,297 A * 6/1993 Graff ..................... B29C 70/865 29/889.7
6,676,080 B2 * 1/2004 Violette .................. B64C 11/04 416/204 R
7,101,154 B2 * 9/2006 Dambrine ............... B29C 70/48 442/205
8,499,450 B2 * 8/2013 Naik .................... D03D 13/004 29/889.71
8,685,868 B2 4/2014 Bouillon et al.
8,882,464 B2 * 11/2014 Smith ..................... B64C 11/24 416/145
11,131,197 B2 * 9/2021 Courtier ................ B29C 70/345
11,377,969 B2 * 7/2022 McCaffrey .............. F01D 5/284
12,134,460 B2 * 11/2024 Joudon ................. F01D 5/3007
12,203,484 B2 1/2025 Gondre et al.
12,448,892 B2 * 10/2025 Kray ....................... B64C 11/04
12,535,008 B2 * 1/2026 Kryj-Kos ................ F01D 5/282
2024/0181745 A1 6/2024 Tsumura et al.

FOREIGN PATENT DOCUMENTS

WO WO 2022/209454 A1 10/2022
WO WO 2022/248804 A1 12/2022

OTHER PUBLICATIONS

International Search Report (PCT/ISA/210), issued in PCT/FR2023/051588, dated Feb. 8, 2024.

* cited by examiner

VARIABLE PITCH VANE FOR A TURBOMACHINE FAN HAVING A STIFFNESS GRADIENT IN THE ROOT

FIELD OF THE INVENTION

The present invention generally concerns the field of variable pitch vanes for a turbomachine fan, of the type comprising an blade capable of extending in an air stream and a root configured to be inserted into a cell of a fan hub. It more particularly concerns the field of the variable pitch vanes made of composite material.

One preferred field of application of the invention is that of turbojet engines with an unducted fan (better known as propfan, open rotor and unducted single fan). However, the invention also applies to turbojet engines with a ducted fan and to turboprop engines with one or more propulsive propellers.

BACKGROUND

One of the avenues currently being explored to improve the specific consumption of civil airplane engines consists of the development of turbojet engines with an unducted fan, such as the one described in document FR 3 080 322 A1. These turbojet engines include a conventional turbine engine gas generator, one or more turbine stages of which drive one or more unducted fans extending outside the nacelle of the engine.

The advantage of these unducted fan engines is that the diameter of the fan is not limited by the presence of a fairing so that it is possible to design an engine with a high bypass ratio, and consequently reduced fuel consumption. Thus, in this type of engine, the fan vanes can have a large span.

Moreover, these engines generally comprise a mechanism for modifying the angular position of these vanes (called pitch angle) so as to adapt the thrust generated by the fan according to the different flight phases. In order to facilitate this pivoting of the vanes and reduce the bulk of said vanes at the hub, their root most often extends over only part of the chord length of the blade.

In use, the vanes equipping such turbomachines are subjected to numerous forces, including in particular the forces called 1P forces (also called 1P loads). These forces are cyclic forces resulting from the difference between the direction of incidence of the air stream, which is not guided by the fairing, and the axis of rotation of the fan (engine axis itself positioned with respect to the airplane axis relative to the air stream). They induce a very significant bending load of the vane, particularly in the interface area of the vane with the fan disk. Due to the cyclical nature of these forces (the 1P load of a vane changes each time a vane moves from one position to the diametrically opposite position), they induce accelerated fatigue of the vane. There is therefore a tendency to very strongly limit the admissible 1P forces in order to guarantee the service life of the vanes.

Currently, these vanes are generally made of metal material. Although the vanes made of metal material have good mechanical resistance, they nevertheless have the drawback of having a relatively significant mass. In order to reduce this mass, it is desirable to be able to manufacture these vanes composed at least partly of a composite material structure including a fibrous reinforcement densified by a polymer matrix. However, conventional architectures of composite material vanes do not allow combining resistance to aerodynamic forces, particularly to 1P forces, to which these vanes would be subjected, aerodynamic performance of the blades and limitation of the bulk to the hub (translated by a given geometry).

DISCLOSURE OF THE INVENTION

One objective of the invention is to improve the resistance of fan vanes to the aerodynamic forces to which they are subjected, for example to the 1P forces, without degrading their aerodynamic performance. Another objective is to lighten fan vanes without degrading their resistance to the aerodynamic forces to which they are subjected, for example to the 1P forces, or their aerodynamic performance.

For this purpose, the invention relates, according to a first aspect, to a variable pitch vane for a turbomachine fan, comprising an aerodynamically profiled blade and a root configured to be inserted into a cell of a fan hub, the vane being able to pivot relative to a frame of the fan hub about a pitch axis, the root having a peripheral skin surface and including a bulb and a stalk connecting the bulb to the blade, the bulb being connected to the stalk by a neck defining a local minimum of the section of the root along a plane orthogonal to the pitch axis, in which at least one segment of the root includes a surface layer delimiting at least partly the skin surface and an inner layer comprised between the pitch axis and the surface layer, the surface layer having a first stiffness and the inner layer having a second stiffness strictly greater than the first stiffness, the segment of the root including the neck and at least part of the stalk.

According to particular embodiments of the invention, the variable pitch vane has one or more of the following characteristics, taken separately or in any technically possible combination(s):

- the first stiffness comprises a longitudinal stiffness of the surface layer and the second stiffness comprises a longitudinal stiffness of the inner layer;
- the stalk flares from the neck to the blade;
- the segment of the root extends over at least 30% of the height of the root, measured parallel to the pitch axis;
- the blade has a proximal end of connection to the root, a free distal end, a leading edge, a trailing edge and a chord connecting the leading edge to the trailing edge, and the bulb has a maximum radius, measured along a direction perpendicular to the pitch axis, less than 50%, preferably less than 25%, of the length of the chord of the blade at its proximal end;
- the blade has a maximum thickness at its proximal end, the maximum radius of the bulb being greater than said maximum thickness;
- the bulb has a shape of revolution about the pitch axis;
- the surface layer and the inner layer each extend over the entire height of the segment of the root;
- the inner layer consists of a central layer extending from the pitch axis to the surface layer;
- the segment of the root comprises an intermediate layer interposed between the surface layer and the central layer, the intermediate layer having a third stiffness strictly greater than the first stiffness and strictly lower than the second stiffness;
- the third stiffness comprises a longitudinal stiffness of the intermediate layer;
- the stiffness of the segment of the root increases gradually from the surface layer to the inner layer;
- the segment of the root comprises a central layer extending from the pitch axis to the surface layer, the inner layer consisting of an intermediate layer interposed between the surface layer and the central layer;

the stiffness of the segment of the root decreases between the intermediate layer and the pitch axis;

the first stiffness is less than or equal to 50%, preferably less than or equal to 25%, of the second stiffness;

the surface layer has at each point a thickness, measured along a direction perpendicular to the pitch axis and passing through said point, comprised between 1 and 25% of the radius of the segment of the root measured along this same direction;

the surface layer is made of composite material;

the inner layer consists of a metal structure, for example steel or titanium; the surface layer consists of a woven composite and the inner layer consists of a laminate of unidirectional plies whose fibers are oriented substantially parallel to the pitch axis;

the vane comprises a composite material structure obtained by three-dimensional weaving of warp strands, oriented substantially parallel to the pitch axis, and of weft strands, at least one of the surface layer and of the inner layer consisting of the composite material structure;

the composite material structure has a first warp-weft ratio in the surface layer and a second warp-weft ratio, greater than the first warp-weft ratio, in the inner layer; and the warp strands have a lower take-up in the inner layer than in the surface layer.

The invention also relates, according to a second aspect, to a turbomachine fan comprising a fan hub and a plurality of variable pitch vanes as defined above.

The invention also relates, according to a third aspect, to a turbomachine comprising such a fan.

According to one particular embodiment of the invention, the turbomachine has the following characteristic:

the turbomachine is a turbomachine with an unducted fan.

Finally, according to a fourth aspect, the invention relates to an aircraft comprising such a turbomachine.

BRIEF DESCRIPTION OF THE FIGURES

Other characteristics and advantages of the invention will appear upon reading the following description, given only by way of example and with reference to the appended drawings, in which.

DETAILED DESCRIPTION

Figure 1:
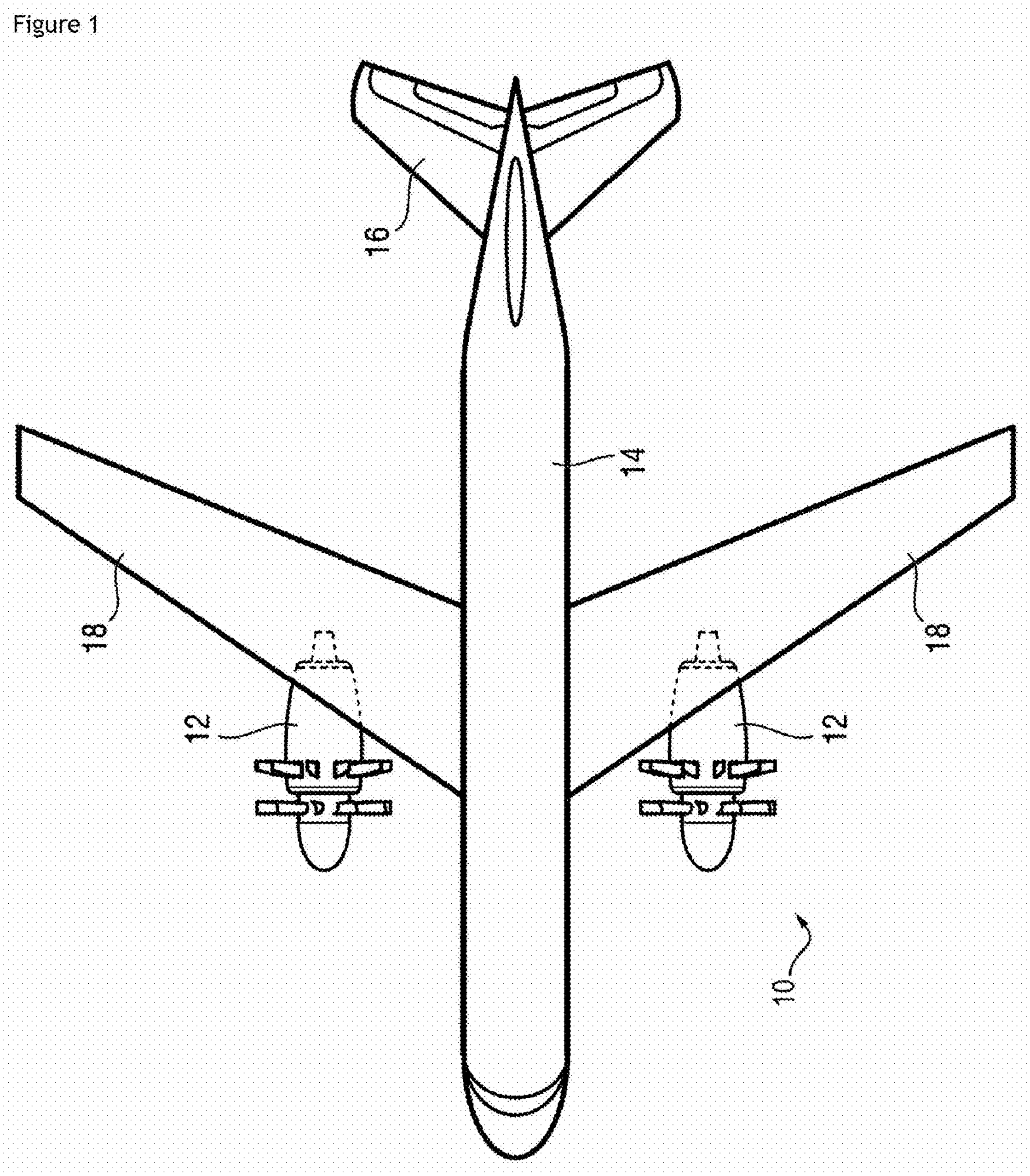
FIG. 1 is a top view of an aircraft according to one exemplary embodiment of the invention.

The aircraft 10 represented in FIG. 1 comprises turbomachines 12 to propel it.

In the example represented, the aircraft 10 is an airplane. It conventionally comprises a fuselage 14, a tailplane 16 and two wings 18. The turbomachines 12 are here two in number and are each housed under a respective wing 18. As a variant (not represented), the turbomachines 12 are disposed along the fuselage 14, for example in the vicinity of the tailplane 16. As a further variant (also not represented), the aircraft 10 comprises a single turbomachine 12 or at least three turbomachines 12.

Figure 2:
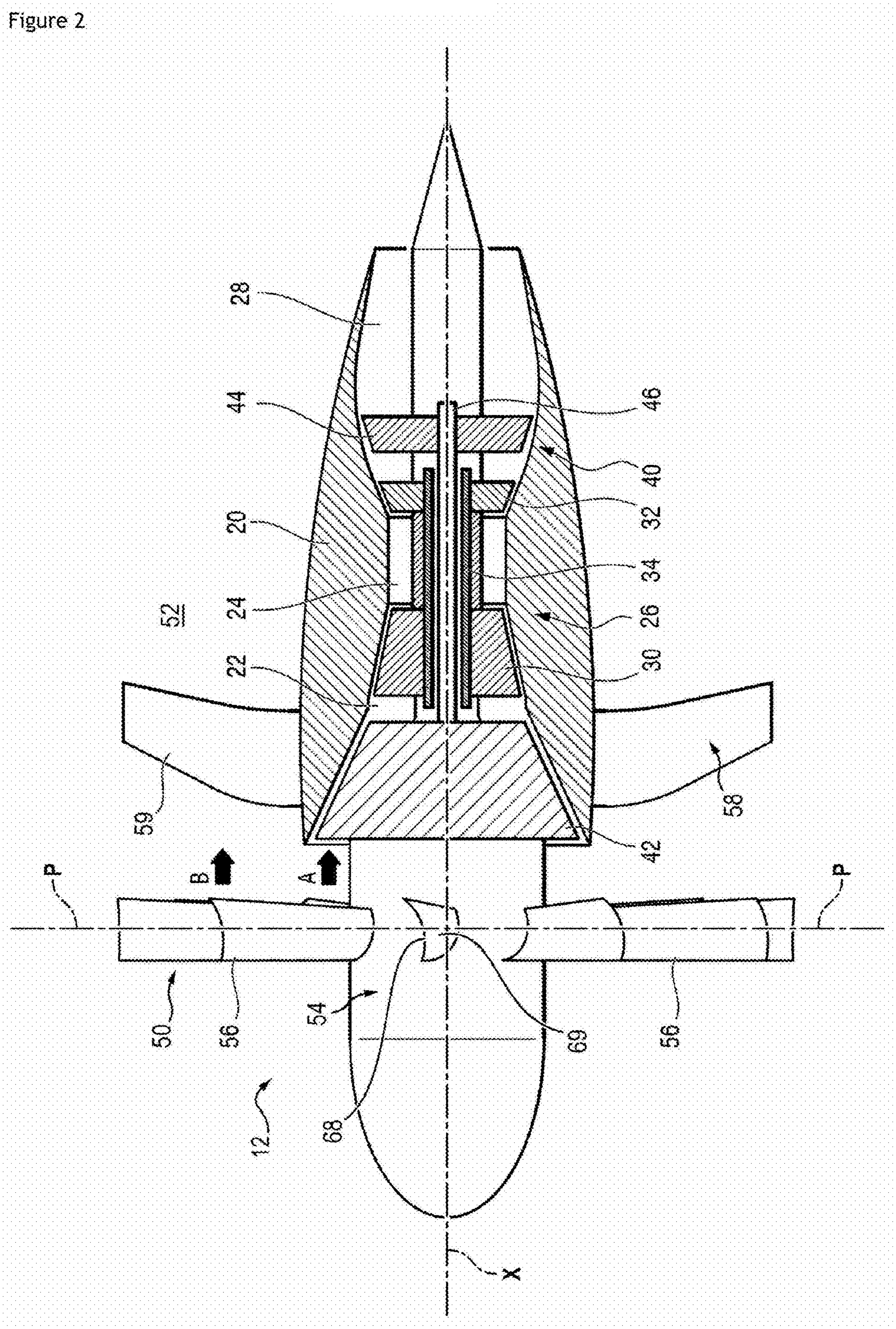
FIG. 2 is a simplified view in partial longitudinal section of a turbomachine of the aircraft of FIG. 1.

One of the turbomachines 12 is represented in FIG. 2.

As visible in this Figure, the turbomachine 12 is elongated along a longitudinal axis X. It typically has an angular symmetry about said longitudinal axis X, that is to say there is at least one angle for which the turbomachine is invariant by rotation about the longitudinal axis X.

Here and in the following, the terms "internal" and "external", "inner" and "outer", as well as their variations, are understood with reference to the axis X, an element described as "internal" or "inner" being oriented towards the axis X while an "external" or "outer" element is oriented opposite to the axis X.

The turbomachine 12 conventionally comprises a nacelle 20, an inner flowpath 22 for the circulation of an air stream through the nacelle 20, a combustion chamber 24 housed in the flowpath 22, an engine body 26 and a gas exhaust nozzle 28.

Hereinafter, the terms "upstream" and "downstream" are understood with reference to a flow direction of an air stream through the flowpath 22.

The engine body 26 comprises a compressor 30, a turbine 32 and a transmission shaft 34 coupling the turbine 32 to the compressor 30 for driving the compressor 30 by the turbine 32. The compressor 30 is disposed upstream of the combustion chamber 24 and supplies the combustion chamber 24 with compressed air. The turbine 32 is disposed downstream of the combustion chamber 24 and receives the exhaust gases leaving the combustion chamber 24.

The transmission shaft 34 has the longitudinal axis X as axis of rotation.

The transmission shaft 34 is guided in rotation relative to the nacelle 20 by means of bearings (not represented).

In the example represented, the turbomachine 12 is a multi-spool turbomachine, particularly a twin-spool turbomachine, comprising a low-pressure body 40 in addition to the engine body 26. The engine body 26 then constitutes a high-pressure body, the compressor 30 being a high-pressure compressor, the turbine 32 being a high-pressure turbine and the transmission shaft 34 being a high-pressure shaft.

The low-pressure body 40 comprises a low-pressure compressor 42, a low-pressure turbine 44 and a low-pressure shaft 46 coupling the low-pressure turbine 44 to the low-pressure compressor 42 for driving the low-pressure compressor 42 by the low-pressure turbine 44.

The low-pressure compressor 42 is disposed upstream of the high-pressure compressor 30 and supplies the latter with compressed air. The low-pressure turbine 44 is disposed downstream of the high-pressure turbine 32 and receives the exhaust gases leaving the latter.

The low-pressure shaft 46 is guided in rotation relative to the nacelle 20 by means of bearings (not represented).

The low-pressure shaft 46 is coaxial with the high-pressure shaft 34. It therefore also has the longitudinal axis X as axis of rotation. Particularly, the low-pressure shaft 46 extends inside the high-pressure shaft 34.

The turbomachine 12 also comprises a fan 50 for driving the air stream in an outer circulation flowpath 52 surrounding the nacelle 20. A distinction is thus made between a primary (hot) air stream A, consisting of the portion of the air stream driven in the inner circulation flowpath 22, and a secondary (cold) air stream B, consisting of the portion of the air stream driven in the outer circulation flowpath 52.

The fan 50 comprises a fan rotor 54. This fan rotor 54 is rotatably mounted relative to the nacelle 20 about the longitudinal axis X. It comprises a hub 55 (FIG. 3) provided with fan vanes 56 extending substantially radially outwardly from the hub 55. These vanes 56, when rotated, drive the air stream in the outer circulation flowpath 52.

The fan rotor 54 is driven in rotation by the low-pressure turbine 44, via the low-pressure shaft 46. In the example represented, this drive is direct, that is to say the fan rotor 54 is secured in rotation to the low-pressure shaft 46. As a variant (not represented), this driving is made via a reducer allowing the fan rotor 54 to rotate at a speed lower than that of the low-pressure shaft 46.

In the example represented, the fan 50 also comprises a fan stator 58 comprising vanes 59 arranged at the periphery of the nacelle 20, in the outer circulation flowpath 52, along a plane orthogonal to the longitudinal axis X. This fan stator 58 is here arranged downstream of the fan rotor 54. As a variant (not represented), the fan 50 comprises, instead of the fan stator 58, a counter-rotating fan rotor.

Advantageously, the fan 50 is, as represented, unducted, that is to say the outer circulation flowpath 52 has no peripheral delimitation. The turbomachine 12 then consists, as represented, of a turbojet engine with an unducted fan or, as a variant, of a turboprop engine. As a variant (not represented), the outer circulation flowpath 52 is defined between the nacelle 20 and a fan casing surrounding the fan 50; the turbomachine 12 then typically consists of a turbojet engine with a high bypass ratio, the bypass ratio being defined as the ratio of the flow rate of the secondary (cold) stream B to the flow rate of the primary (hot) stream A.

In the example represented, the turbomachine 12 is particularly of the "puller" type, that is to say the fan 50 is disposed upstream of the inner circulation flowpath 22 and also drives the air stream in the latter. As a variant (not represented), the turbomachine is of the "pusher" type, that is to say the fan 50 is placed around the downstream half of the nacelle 20.

Figure 3:
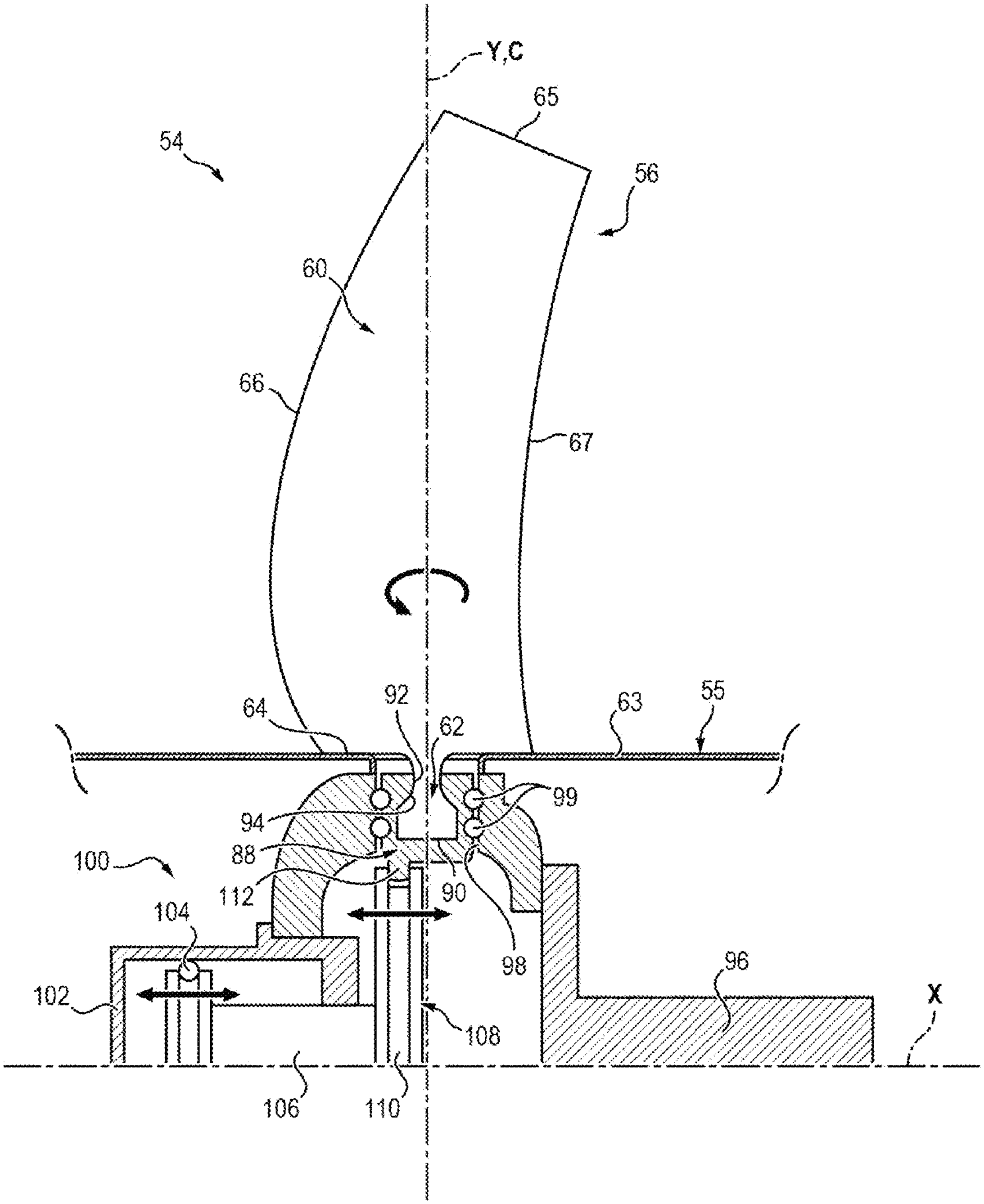
FIG. 3 is a simplified view in partial longitudinal section of part of a fan of the turbomachine of FIG. 2.

One of the vanes 56 of the fan rotor 54 is schematically illustrated in FIG. 3. As visible in this Figure, it is elongated along a substantially radial direction of elongation Y, that is to say perpendicular to the longitudinal axis X. In what follows, "height" will refer to a distance along the elongation axis Y.

The vane 56 comprises an aerodynamically profiled blade 60 and a root 62.

The blade 60 extends radially outside a casing 63 of the hub 55 which internally delimits the outer circulation flowpath 52. The blade 60 is thus capable of extending into the air stream circulating in said flowpath 52. It is shaped so as to generate lift when it is moved in said air stream.

The blade 60 has a proximal end 64 of connection to the root 62, a free distal end 65, a leading edge 66, a trailing edge 67 and a chord (not represented), orthogonal to the elongation axis Y, connecting the leading edge 66 to the trailing edge 67.

The blade 60 also has an intrados 68 (FIG. 2) and an extrados 69 (FIG. 2). In the following, "thickness" will refer to a distance in a plane normal to the elongation axis Y and along an axis extending between the intrados 68 and the extrados 69.

Figure 4:
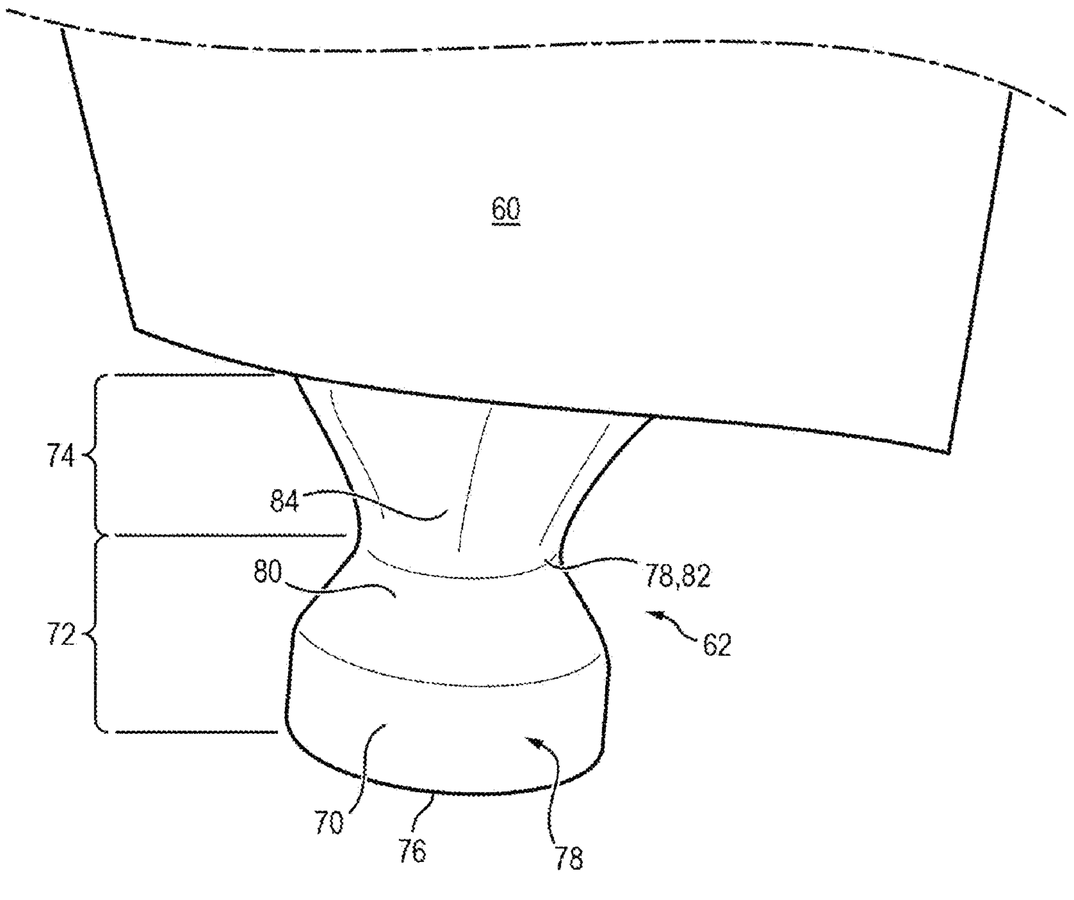
FIG. 4 is a perspective view of a root of the vane of FIG. 3, and FIGS. 5 to 11 are simplified views in longitudinal section of different variants of a segment of the vane root of FIG. 3.

With reference to FIG. 4, the root 62 has a peripheral skin surface 70. It also includes a bulb 72 and a stalk 74.

The bulb 72 constitutes a radially inner part of the root 62. It delimits an inner end 76 of the vane 56, that is to say the end of the vane 56 closest to the axis X. It extends from said inner end 76 to a junction surface 78 connecting the bulb 72 to the stalk 74. This junction surface 78 is typically discoidal.

The bulb 72 flares from the junction surface 78 opposite to the blade 60, thus delimiting a support surface 80 oriented towards the blade 60. The support surface 80 constitutes a part of the skin surface 70.

The bulb 72 has a maximum radius, measured along a direction perpendicular to the elongation axis, less than 50%, preferably less than 25%, of the length of the chord of the blade 60 at its proximal end 64. This maximum radius is typically greater than the maximum thickness of the blade 60 at its proximal end 64.

It preferably has a shape of revolution about the elongation axis Y.

The stalk 74 constitutes a radially outer part of the root 62. It connects the bulb 72 to the blade 60. It extends from the blade 60 to the junction surface 78.

The stalk 74 flares from the junction surface 78 to the blade 60. Thus, the junction surface 78 constitutes a neck 82 defining a local minimum of the section of the root 62 along a plane orthogonal to the elongation axis Y.

The flaring of the stalk 74 from the neck 82 to the blade 60 is particularly visible in a plane parallel to the elongation axis Y and to the chord of the blade 60 at its proximal end 64. In a plane parallel to the elongation axis Y and orthogonal to the chord of the blade 60 at its proximal end 64, the stalk 74 narrows from the neck 82 to a minimum thickness 84 before flaring towards the blade 60.

Returning to FIG. 3, the hub 55 comprises for each vane 56 a fastener 88, disposed at the vane root, to which the vane 56 is secured. This fastener 88 delimits a cell 90 into which the root 62 of the vane 56 is inserted. This cell 90 radially opens out to the outside of the fastener 88 through an orifice 92. The fastener 88 delimits, at the periphery of this orifice 92, a bearing surface 94 oriented towards the bottom of the cell 90 opposite to the orifice 92. This bearing surface 94 cooperates with the support surface 80 of the bulb 72 to retain the root 62 in the cell 90.

The vanes 56 of the fan rotor 54 are variable pitch vanes, that is to say each vane 56 is pivotally mounted relative to a frame 96 of the hub 55 about a specific pitch axis C. This pitch axis C extends along the direction of elongation Y of the vane 56. It is perpendicular to the longitudinal axis X.

For this purpose, each fastener 88 is rotatably mounted relative to the hub 55 about the pitch axis C. More specifically, the fastener 88 is rotatably mounted inside a housing 98 arranged in the frame 96 of the hub 55 by means of balls 99 or other rolling elements.

The fan 50 further comprises a pitch change mechanism 100 for adjusting the pitch angle of each vane 56 about its pivot axis P so as to adapt the performance of the turbomachine 12 to the different flight phases. This pitch change mechanism 100 comprises an actuator 102 including a fixed part 104 secured to the frame 96 and a movable part 106 movable in translation along the longitudinal axis X relative to the fixed part 104 between a retracted position and a deployed position. It also comprises a connection system 108 connecting the movable part 106 to the fastener 88 so as to convert the translation of the movable part 106 along the longitudinal axis X into a rotation of the fastener 88 and, thereby, of the vane 56 about the pitch axis C. This connection system 108 is here formed of an annular slide 110 mounted secured to the movable part 106 and a pin 112 mounted secured to the fastener 88 and capable of sliding in the slide 110 and rotating relative to the slide 110.

With reference to FIGS. 5 to 10, each vane 56 comprises a composite material structure 120. As visible in said Figures, the root 62 is at least partially formed by said structure 120. This structure 120 includes a fibrous reinforcement obtained by three-dimensional weaving and a matrix in which the fibrous reinforcement is embedded.

The fibrous reinforcement is typically formed from a single-piece fibrous preform with variable thickness comprising warp strands 122 (that is to say strands extending along the elongation axis Y of the vane 56) and weft strands 124 (that is to say strands extending along the chord of the vane 56), these strands 122, 124 comprising for example carbon, glass, basalt, and/or aramid fibers. Said fibrous preform is advantageously obtained by three-dimensional or multi-layer weaving, that is to say the warp strands 122 follow sinuous paths in order to interlink weft strands 124 belonging to different weft strand layers 124, it being noted that said three-dimensional weaving may include surface 2D weaving. Different three-dimensional weaves may be used, such as interlock, multi-satin or multi-plain weaves, for example, as described in particular in document WO 2006/136755.

During the weaving, a tension is applied to the warp strands 122 and to the weft strands 124 in order to give them predetermined differential stiffness and therefore respective take-up. By take-up of a strand, it will be meant here the difference between the length of a given strand when it is perfectly straight and the actual length (in the fibrous reinforcement) of this strand due to the intertwining it achieves in order to interlink with the other strands, and thus defining what is commonly called woven weave of the fibrous reinforcement. The take-up is generally expressed as a percentage and thus characterizes the crimp of the strand. In a manner known per se, when a given strand is straight, its take-up is equal to 0%; the more crimp the strand, the higher its take-up.

The matrix is typically a polymer matrix, for example epoxy, bismaleimide or polyimide. The vane 56 is then formed by molding by means of a vacuum resin injection method of the RTM (Resin Transfer Molding) or VARTM (Vacuum Resin Transfer Molding) type.

Figure 5:
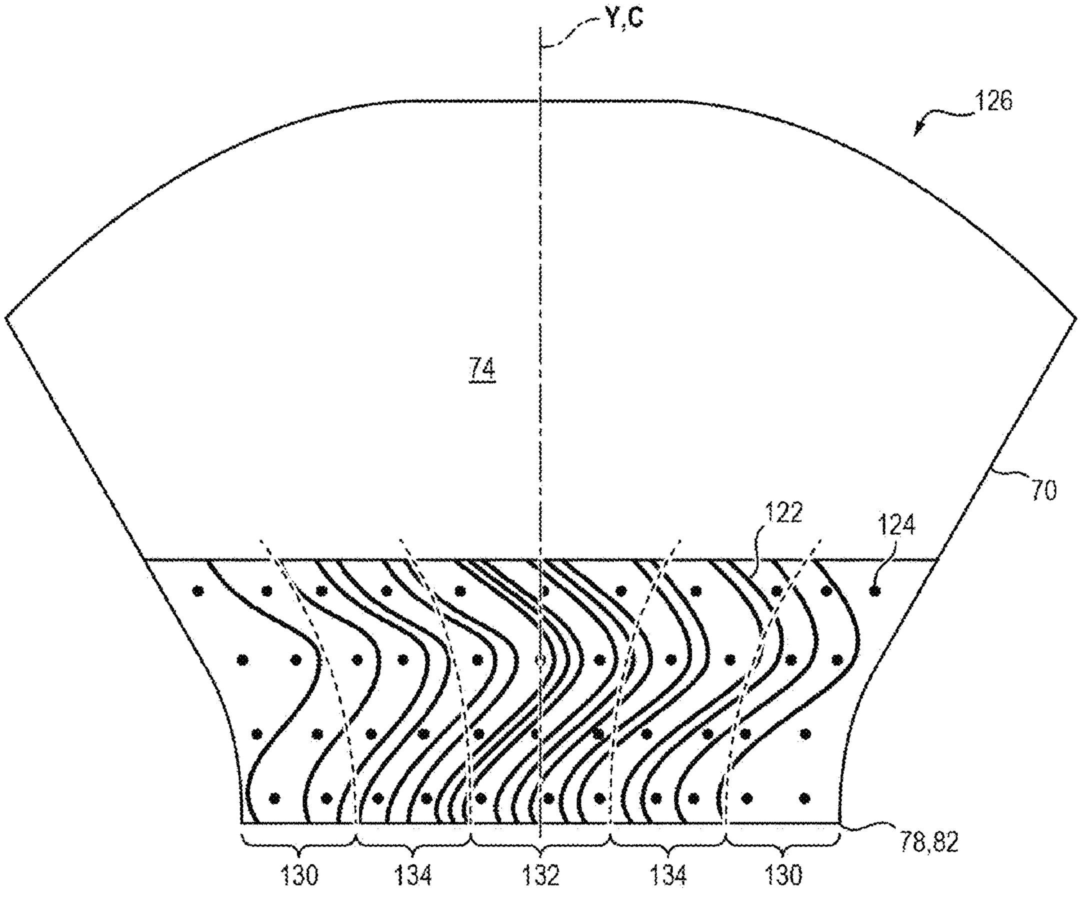

As visible in FIG. 5, the root 62 comprises a segment 126 including a surface layer 130 delimiting at least partly the skin surface 70 of the root 62 and a core central layer 132 extending from the pitch axis C towards the surface layer 130, the surface layer 130 having a first stiffness and the central layer 132 having a second stiffness strictly greater than the first stiffness. In the example represented in FIG. 5, the root 62 also comprises an intermediate layer 134 interposed between the surface layer 130 and the central layer 132, the intermediate layer 134 having a third stiffness strictly greater than the first stiffness and strictly lower than the second stiffness. The surface layer 130, the central layer 132 and the intermediate layer 134 each extend over the entire height of the segment 126, that is to say each of said layers 130, 132, 134 extends from a lower end (not referenced) to an upper end (not referenced) of said segment 126, said lower and upper ends of the segment 126 delimiting the segment 126 along the elongation axis Y.

The stiffness is understood here and hereinafter as comprising at least the longitudinal stiffness, that is to say measured orthogonally to the chord of the vane 56 and substantially parallel to the skin surface 70. Advantageously, the stiffness also comprises the transverse stiffness, that is to say measured orthogonally to the direction of elongation Y and substantially parallel to the skin surface 70, the stiffness then being compared direction by direction (that is to say the sentence "the stiffness of the layer A is greater than the stiffness of the layer B" means that the longitudinal stiffness of the layer A is greater than the longitudinal stiffness of the layer B and that the transverse stiffness of the layer A is greater than the transverse stiffness of the layer B). This stiffness is typically measured by cutting a standardized test specimen from the layer 130, 132 or 134 concerned and measuring the stiffness of this test specimen by means of standardized tests, the shape of the cut test specimen and the tests carried out to determine the stiffness thereof being the same for each of the layers 130, 132 and 134.

The first stiffness is less than or equal to 50%, preferably less than or equal to 25%, of the second stiffness. The third stiffness is less than or equal to 66%, preferably less than or equal to 50%, of the second stiffness. Advantageously, the stiffness is substantially halved at each layer change; thus, typically, the third stiffness is substantially equal to 50% of the second stiffness and the first stiffness is substantially equal to 25% of the second stiffness.

Preferably, the stiffness varies continuously at the interface between the layers 130, 132, 134 and inside the intermediate layer 134, such that the stiffness of the segment 126 increases gradually from the surface layer 130 to the central layer 132. Advantageously, the stiffness also varies continuously inside the surface layer 130 and the central layer 132, such that the stiffness of the segment 126 increases gradually from the pitch axis C to the skin surface 70 of the root 62.

The segment 126 includes the neck 82 and at least the internal part of the stalk 74, that is to say the part of the stalk 74 closest to the bulb 72. It extends over at least 30% of the height of the root 62, for example over between 30 and 60% of the height of the root.

Preferably, the segment 126 includes more than 30% of the height of the stalk 74. Optionally, the segment 126 extends over 100% of the height of the stalk 74, that is to say the stalk 74 is entirely comprised in the segment 126, which then extends to the blade 60.

Advantageously, the segment 126 also extends in the bulb 72 and includes at least the external part of the bulb 72, that is to say the part of the bulb 72 closest to the stalk 74. It then typically includes at least 30% of the height of the bulb 72.

The surface layer 130 has at each point a thickness, measured along a direction perpendicular to the pitch axis C and passing through said point, comprised between 1 and 25% of the radius of the segment 126 measured along this same direction. The central layer 132, for its part, has at each point a thickness, measured along a direction perpendicular to the pitch axis C and passing through said point, comprised between 20 and 40% of the radius of the segment 126 measured along this same direction.

Figure 6:
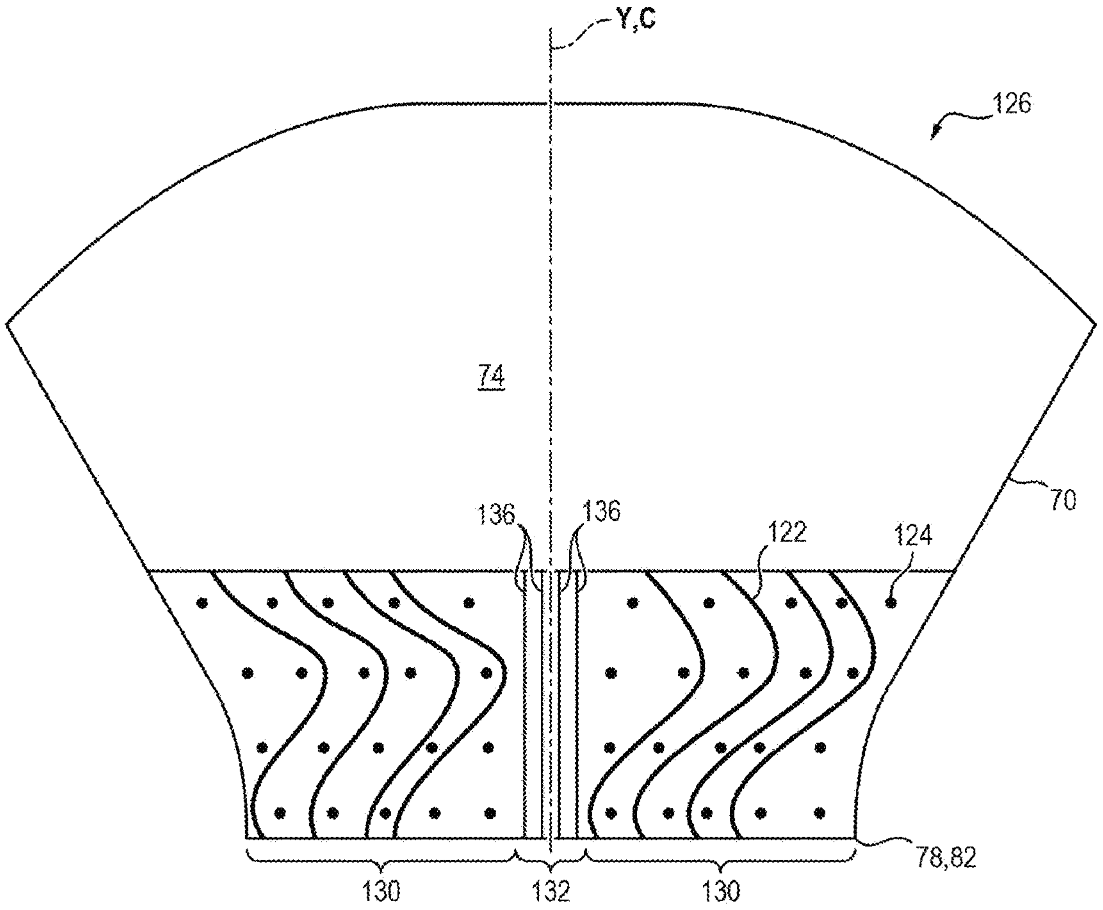
Figure 7:
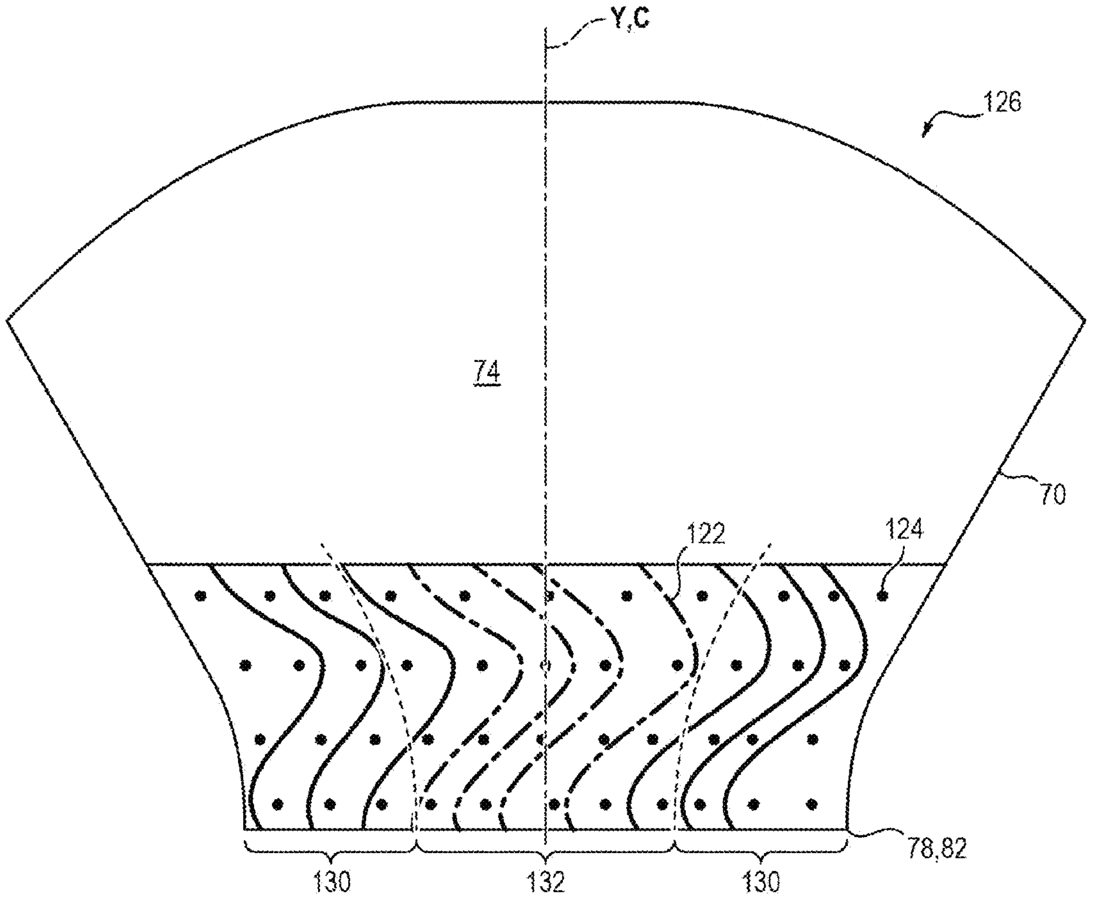

At least one of the layers 130, 132, 134 consists of the composite material structure 120. In the examples of FIGS. 5 to 9, the surface layer 130 consists of the composite material structure 120. In the examples of FIGS. 5, 6 and 7, the central layer 132 and, where appropriate, the intermediate layer 134 also consist of the composite material structure 120.

In the exemplary embodiment of FIG. 5, the difference in stiffness between the layers 130, 132, 134 is obtained by a difference in the warp-weft ratio, this ratio increasing as the stiffness increases. Thus, the warp-weft ratio in the central layer 132 is greater than the warp-weft ratio in the surface layer 130. Furthermore, the warp-weft ratio in the intermediate layer 134 is, where appropriate, comprised between the warp-weft ratio in the central layer 132 and the warp-weft ratio in the surface layer 130 and is preferably close to an average between the warp-weft ratio in the central layer 132 and the warp-weft ratio in the surface layer 130.

The central layer 132 and, where appropriate, the intermediate layer 134 thus have, relative to the surface layer 130, excess warp strands 122. Advantageously, these excess warp strands 122 gradually mix with the weft strands 124 of the surface layer 130 from an upper end of the segment 126 in order to limit the property change gradients in the composite material structure 120 (stiffness and breaking strength) that would be likely to weaken the vane 56.

In the exemplary embodiment of FIG. 6, the difference in stiffness between the layers 130, 132, 134 is obtained by a difference in the take-up of the warp strands 122, the take-up being lower as the stiffness increases. The take-up of the warp strands 122 is thus lower in the central layer 132 than in the surface layer 130. Furthermore, the take-up of the warp strands 122 in the intermediate layer 134 is, where appropriate, greater than in the central layer 132 and lower than in the surface layer 130.

This take-up difference is here obtained by inserting into the central layer 132 unidirectional warp strands 136, that is to say warp strands 122 with a take-up of 0%, the surface layer 130 being free of such unidirectional warp strands 136. These unidirectional warp strands 136 are typically free warp strands, that is to say they are not intertwined with weft strands 124. The central layer 132 here consists of said unidirectional warp strands 136.

Advantageously, the unidirectional warp strands 136 of the central layer 132 gradually mix with the weft strands 124 of the surface layer 130 and, where appropriate, of the intermediate layer 134 from an upper end of the segment 126 in order to limit the property change gradients in the composite material structure 120 (stiffness and breaking strength) that would be likely to weaken the vane 56.

As a variant (not represented), the difference in take-up is obtained by applying a different tension to the warp strands 122 and/or to the weft strands 124 in the loom used to produce the fibrous reinforcement so that the tension undergone by the core warp strands 122 (in the central layer 132) is greater than the tension undergone by the warp strands 122 in the vicinity of the skin (in the surface layer 130) and/or the tension undergone by the core weft strands 124 is lower than the one undergone by the weft strands 124 in the vicinity of the skin. The modification of the tension applied to the weft strands 124 has indeed a direct impact on the tension undergone by the warp strands 122 in the vicinity of their interface with the weft strands 124 and therefore their take-up and their stiffness. For example, the difference in tension undergone by the warp strands 122 is obtained by increasing the tension applied to the warp strands 122 in the central layer 132 and/or by reducing the tension applied to the warp strands 122 in the surface layer 130 and, where appropriate, in the intermediate layer 134. As a variant or optionally, the difference in tension undergone by the warp strands 122 is obtained by reducing the tension applied to the weft strands 124 in the central layer 132 and/or by increasing the tension applied to the weft strands 124 in the surface layer 130 and, where appropriate, in the intermediate layer 134.

The variation in tension applied by the loom to the warp 122 and/or weft 124 strands can be obtained by any suitable means, the principle being to exert a restoring tension directly at the outlet of the bobbin on which the strand is wound. In a manner known per se, this tension can be applied by a spring system pulling each warp strand 122, or using weights positioned between the outlet of the warp strand 122 from the bobbin and eyelets of the heddles of the loom. Moreover, bobbins are commercially available for controlling the applied tension. Finally, the tension applied to the weft strands 124 can be managed in a similar manner as for the warp strands 122, and/or by using a clamp that catches the end of the weft strand 124 and pulls it through the shed (interlacing of the warps), then releases the weft strand 124 once the beat of the loom has moved on to the next sequence. These means for applying a tension to a (warp 122 or weft 124) strand being known per se, they will not be detailed further here.

When the difference in tension is obtained by applying a different tension to the warp strands 122 of the central layer 132 and to the warp strands 122 of the surface layer 130 and, where appropriate, of the intermediate layer 134, the warp strands 122 of the surface layer 130 and, where appropriate, of the intermediate layer 134 are advantageously gradually removed from the fibrous reinforcement from an upper end of the segment 126 and replaced by as many warp strands 122 undergoing a tension equivalent to that of the warp strands 122 of the central layer 132, in order to limit the property change gradients in the composite material structure 120 (stiffness and breaking strength) that would be likely to weaken the vane 56.

In the exemplary embodiment of FIG. 7, the difference in stiffness between the layers 130, 132 is obtained by a difference in the nature of the fibers composing the warp 122 and/or weft 124 strands of the central layer 132 and those composing the warp 122 and/or weft 124 strands of the surface layer 130 and, where appropriate, of the intermediate layer 134. The warp 122 and/or weft 124 strands of the surface layer 130 thus typically consist of fibers of a first material, those of the central layer 132 consist of fibers of a second material, and those of the intermediate layer 134, where appropriate, consist of a third material, the first material having a modulus of elasticity lower than that of the second material and the third material having, where appropriate, a modulus of elasticity comprised between those of the first and second materials and preferably close to the average of said moduli of elasticity. For example, the first material has a modulus of elasticity comprised between 150 and 190 GPa and typically consists of glass or basalt, the second material has a modulus of elasticity comprised between 240 and 350 GPa and typically consists of carbon, and the third material has a modulus of elasticity comprised between 195 and 235 GPa and typically consists of carbon.

Advantageously, the warp strands 122 of the surface layer 130 and, where appropriate, of the intermediate layer 134 are gradually removed from the fibrous reinforcement from an upper end of the segment 126 and replaced by as many warp strands 122 in second material, in order to limit the property change gradients in the composite material structure 120 (stiffness and breaking strength) that would be likely to weaken the vane 56.

Figure 8:
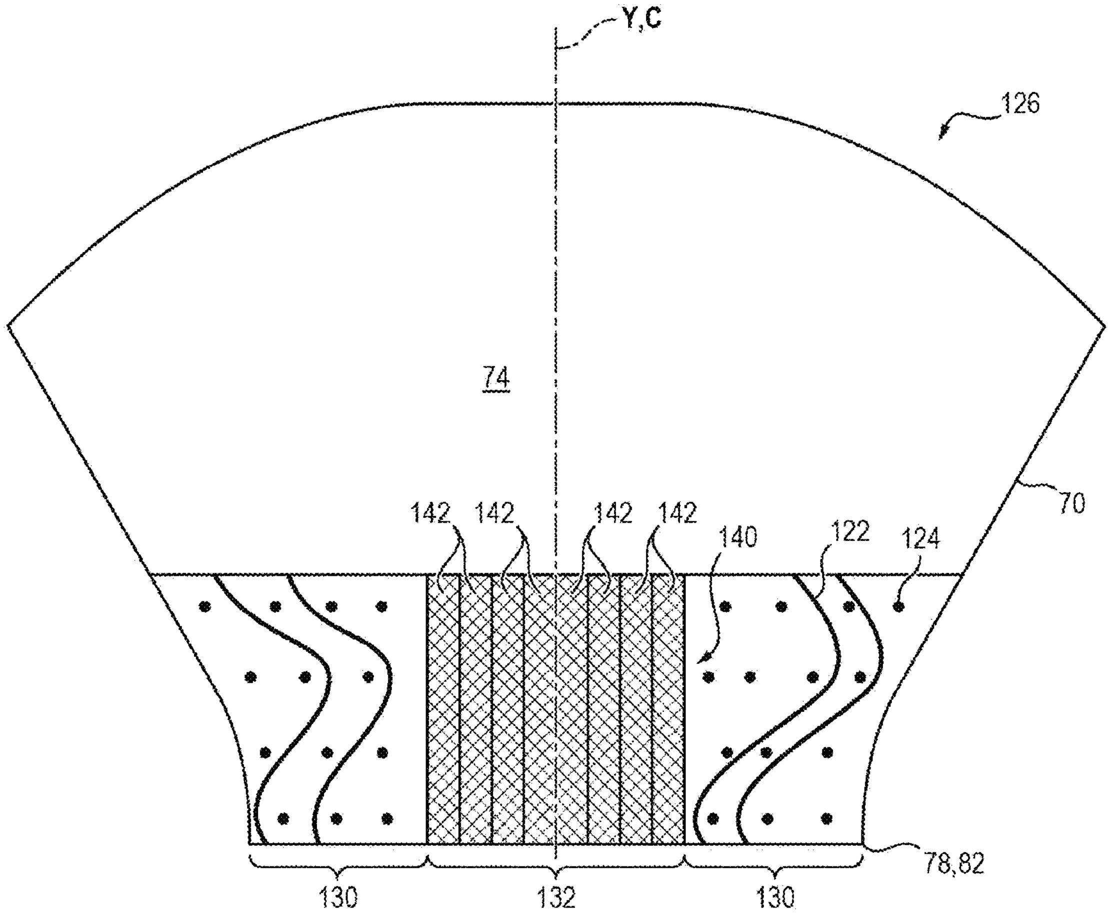
Figure 9:
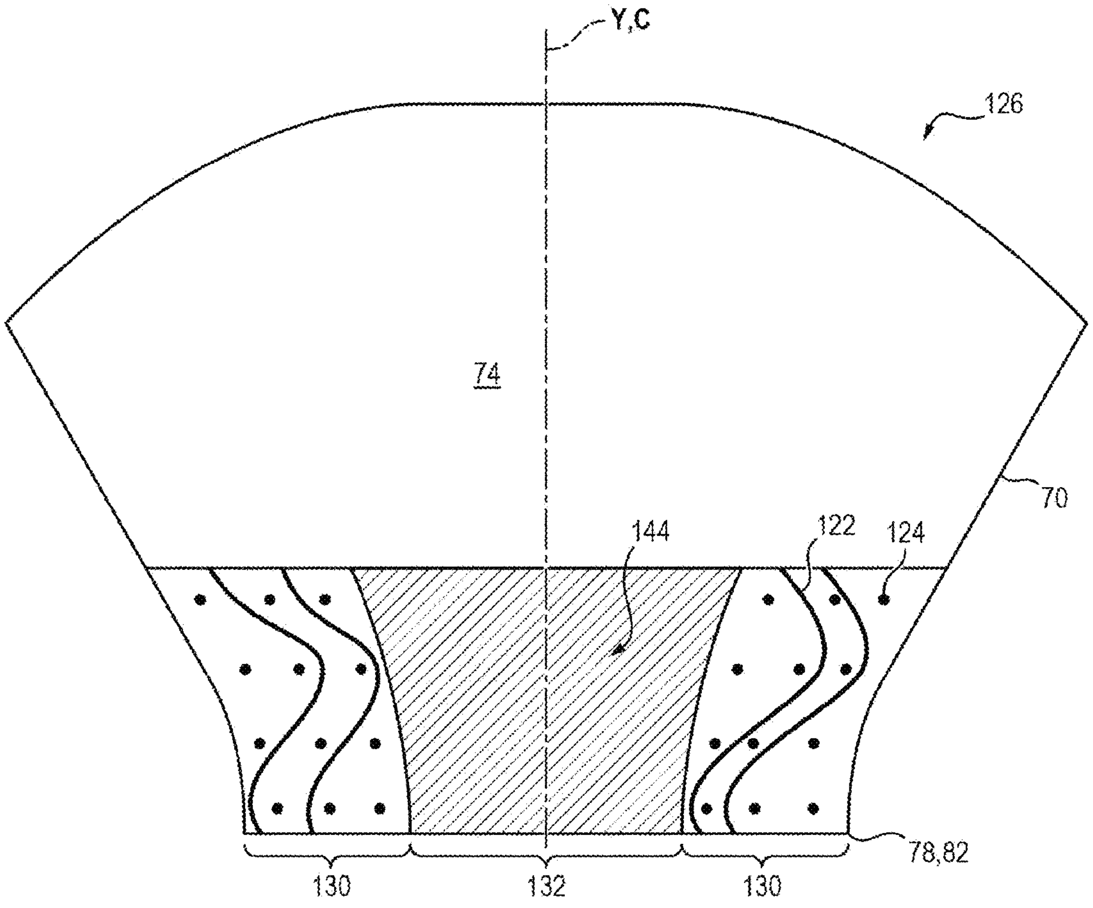

In the examples of FIGS. 8 and 9, only the surface layer 130 consists of the composite material structure 120. The central layer 132 for its part consists of another stiffer structure. The intermediate layer 134 does not exist.

Thus, in the exemplary embodiment of FIG. 8, the central layer 132 consists of a laminate 140 of unidirectional plies 142 whose fibers are oriented substantially parallel to the pitch axis C. In the exemplary embodiment of FIG. 9, the central layer 132 consists of a structure 144 made of metal, for example steel or titanium.

Advantageously, the thickness of the laminate 140 or of the metal structure 144 decreases gradually from an upper end of the segment 126, this loss of thickness being compensated by the gradual introduction of additional warp 122 and weft 124 strands into the composite material structure 120, in order to limit the property change gradients in the vane 56 (stiffness and breaking strength) that would be likely to weaken the vane 56.

Figure 10:
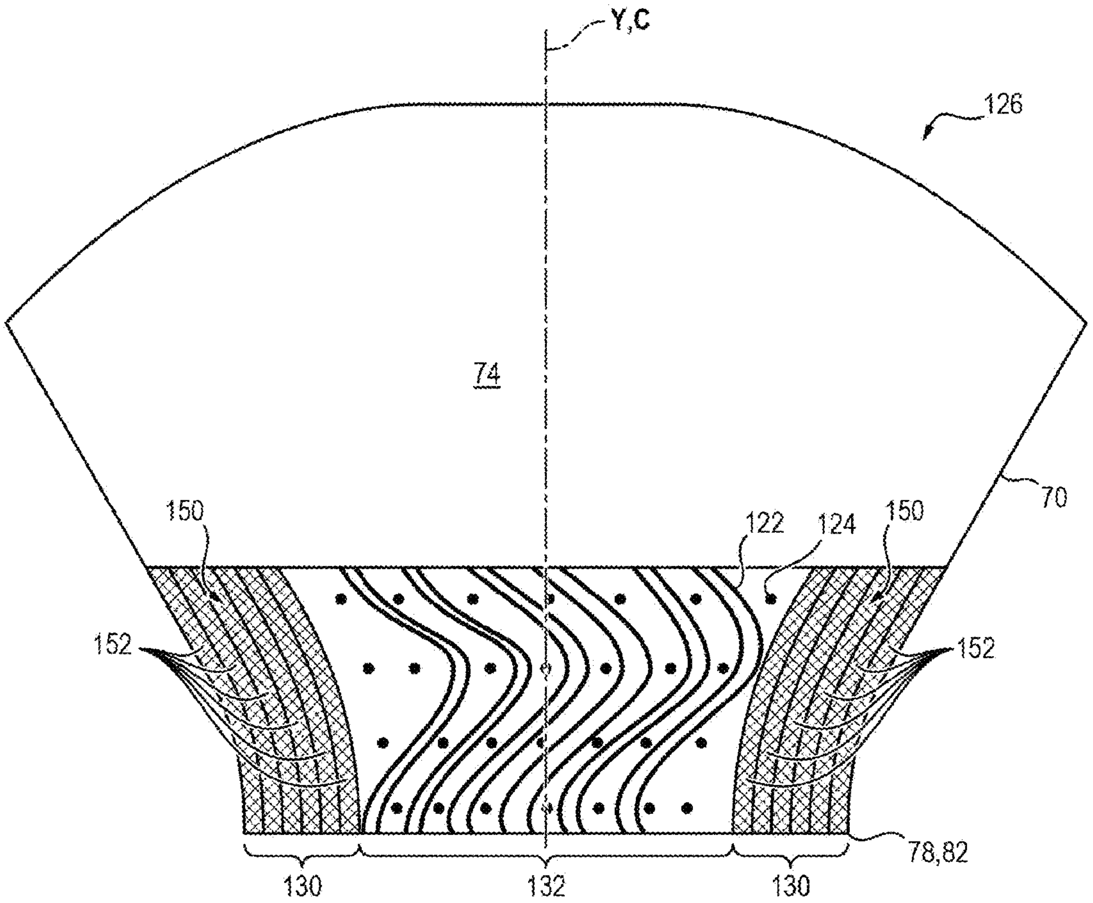

In the example of FIG. 10, only the central layer 132 consists of the composite material structure 120. The surface layer 130 for its part consists of another more flexible structure. The intermediate layer 134 does not exist.

Thus, in the example represented, the surface layer 130 consists of a laminate 150 of added plies 152. These added plies 152 are preferably multidirectional, for example bidirectional, plies. Each added ply 152 typically consists of a 2D woven web or of a non-crimp fabric web (better known by the acronym NCF).

The added plies 152 are preferably inclined plies whose fibers are oriented at an angle comprised between 5 and 95°, advantageously comprised between 20 and 60°, for example substantially equal to 45°, relative to the pitch axis C. As a variant or optionally, the fibers of the added plies 152 have a lower modulus of elasticity than the fibers constituting the warp 122 and weft 124 strands of the composite material structure 120.

Advantageously, the thickness of the laminate 150 decreases gradually from an upper end of the segment 126, this loss of thickness being compensated by the gradual introduction of additional warp 122 and weft 124 strands into the composite material structure 120, in order to limit the property change gradients in the vane 56 (stiffness and breaking strength) that would be likely to weaken the vane 56.

It will be noted that these different exemplary embodiments can be combined with each other. Thus, in non-represented embodiments of the invention:

- the segment 126 comprises the surface layer 130, the central layer 132 and the intermediate layer 134,
  - the central layer 132 consisting of:
    - the laminate 140 or
    - the metal structure 144, and
  - the central layer 132 and the intermediate layer 134 consisting of the composite material structure 120,
  - the intermediate layer 134 having:
    - a warp-weft ratio greater than that of the surface layer 130 and/or
    - warp strands 122 having a lower take-up than that of the warp strands 122 of the surface layer 130 and/or
    - warp 122 or weft 124 strands composed of fibers of a material having a modulus of elasticity greater than that of the material composing the fibers constituting the warp 122 or weft 124 strands of the surface layer 130;
- the segment 126 comprises the surface layer 130, the central layer 132 and the intermediate layer 134, all three consisting of the composite material structure 120,
  - the central layer 132 having:
    - a warp-weft ratio greater than that of the intermediate layer 134 and/or
    - warp strands 122 having a lower take-up than that of the warp strands 122 of the intermediate layer 134 and/or
    - warp 122 or weft 124 strands composed of fibers of a material having a modulus of elasticity greater than that of the material composing the fibers constituting the warp 122 or weft 124 strands of the intermediate layer 134, and
  - the intermediate layer 134 having:
    - a warp-weft ratio greater than that of the surface layer 130 and/or
    - warp strands 122 having a lower take-up than that of the warp strands 122 of the surface layer 130 and/or
    - warp 122 or weft 124 strands composed of fibers of a material having a modulus of elasticity greater than that of the material composing the fibers constituting the warp 122 or weft 124 strands of the surface layer 130;
- the segment 126 comprises the surface layer 130, the central layer 132 and the intermediate layer 134,
  - the surface layer 130 consisting of the laminate 150,
  - the intermediate layer 134 consisting of the composite material structure 120, and
  - the central layer 132 consisting of:
    - the composite material structure 120 and having:
      - a warp-weft ratio greater than that of the intermediate layer 134 and/or
      - warp strands 122 having a lower take-up than that of the warp strands 122 of the intermediate layer 134 and/or
      - warp 122 or weft 124 strands composed of fibers of a material having a modulus of elasticity greater than that of the material composing the fibers constituting the warp 122 or weft 124 strands of the intermediate layer 134, or
    - the laminate 140, or
    - the metal structure 144;
- the segment 126 comprises only the surface layer 130 and the central layer 132, both consisting of the composite material structure 120, the central layer 132 having a warp-weft ratio greater than that of the surface layer 130 and/or of the warp strands 122 having a lower take-up than that of the warp strands 122 of the surface layer 130 and/or of the warp 122 or weft 124 strands composed of fibers of a material having a modulus of elasticity greater than that of the material composing the fibers constituting the warp 122 or weft 124 strands of the surface layer 130.

Although, in the exemplary embodiments described above, it is the central layer that has the highest stiffness, the invention is not limited to this embodiment alone. In general, it is appropriate for the layer having the highest stiffness to be an inner layer comprised between the pitch axis C and the surface layer 130.

Figure 11:
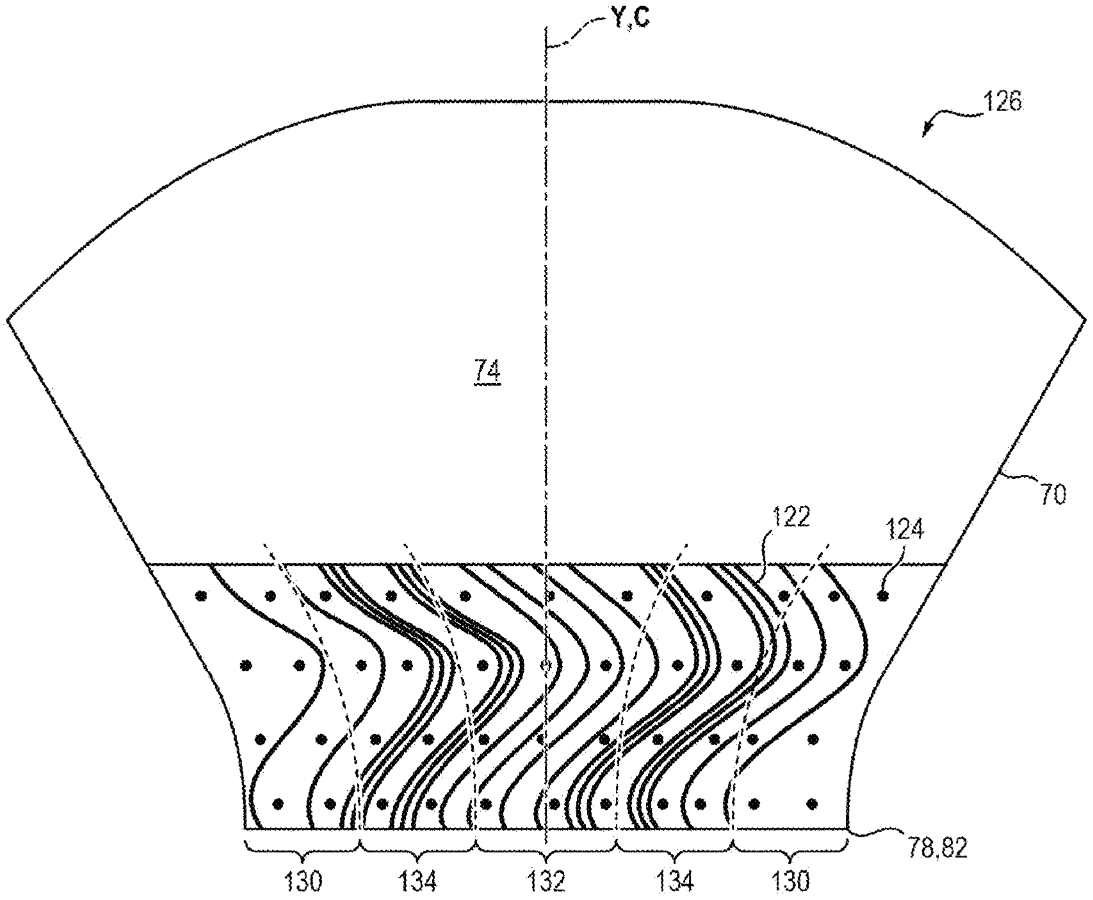

Thus, in another embodiment represented in FIG. 11, the layer having the highest stiffness is the intermediate layer 134.

The stiffness of the intermediate layer 134 is then strictly greater than the first stiffness (of the surface layer 130) and than the second stiffness (of the central layer 132). The second stiffness is preferably greater than or equal to the first stiffness. Typically, the first stiffness is less than or equal to 50%, preferably less than or equal to 25%, of the stiffness of the intermediate layer 134, and the second stiffness is less than or equal to 66%, preferably less than or equal to 50%, of the stiffness of the intermediate layer 134.

Advantageously, the stiffness varies continuously at the interface between the layers 130, 132, 134 and inside the surface layer 130 and the central layer 132, such that the stiffness of the segment 126 increases gradually from the pitch axis C to the intermediate layer 134, then decreases, still gradually, from the intermediate layer 134 to the skin surface 70 of the root 62.

In the example represented in FIG. 11, the higher stiffness of the intermediate layer 134 is obtained by a warp-weft ratio of the composite material structure 120 inside the intermediate layer 134 higher than the warp-weft ratios encountered in the surface layer 130 and in the central layer 132. As a variant (not represented), this higher stiffness is obtained by:

- the use, in the intermediate layer 134, of warp strands 122 having a lower take-up than that of the warp strands 122 of the surface layer 130 and of the central layer 132; and/or
- the use, in the intermediate layer 134, of warp 122 or weft 124 strands composed of fibers of a material having a modulus of elasticity greater than that of the material composing the fibers constituting the warp 122 or weft 124 strands of the surface layer 130 and of the central layer 132.

Thanks to the exemplary embodiments described above, the neck 82 and the base of the stalk 74 are more flexible in skin and stiffer in core, which reduces the concentrations of the 1P load on the skin of the root 62. Due to the greater stiffness of the core, the stresses due to the 1P load are better distributed in the depth of the root 62, which relieves the skin. The stresses being better distributed, the resistance of the vane 56 to the 1P forces is increased, without modifying its shape and therefore its aerodynamic characteristics. It is thus possible to produce a vane 56 at least partially made of composite material with a sufficient resistance to 1P load in order to equip this vane 56 on a turbojet engine with an unducted fan such as the turbomachine 12. It is thus possible to lighten the vanes of a turbojet engine with an unducted fan, without degrading their resistance to 1P forces or their aerodynamic performance, by simply replacing these vanes with vanes such as the vane 56.

The invention claimed is:

1. A variable pitch vane for a turbomachine fan, comprising an aerodynamically profiled blade and a root configured to be inserted into a cell of a fan hub, the vane being able to pivot relative to a frame of the fan hub about a pitch axis, the root having a peripheral skin surface and including a bulb and a stalk connecting the bulb to the blade, the bulb being connected to the stalk by a neck defining a local minimum of a section of the root along a plane orthogonal to the pitch axis, wherein at least one segment of the root includes a surface layer delimiting at least partly the skin surface and an inner layer comprised between the pitch axis and the surface layer, the surface layer and the inner layer each extending over the entire height of the segment of the root, the surface layer having a first stiffness and the inner layer having a second stiffness strictly greater than the first stiffness, the segment of the root including the neck at least part of the stalk and at least 30% of the height of the bulb.

2. The variable pitch vane of claim 1, wherein the first stiffness is less than or equal to 50%, of the second stiffness.

3. The variable pitch vane of claim 1, wherein the surface layer has at each point a thickness, measured along a direction perpendicular to the pitch axis and passing through said point, comprised between 1 and 25% of a radius of the segment of the root measured along this same direction.

4. The variable pitch vane of claim 1, comprising a composite material structure obtained by three-dimensional weaving of warp strands, oriented parallel to the pitch axis, and of weft strands, at least one of the surface layer and of the inner layer consisting of the composite material structure.

5. The variable pitch vane of claim 4, wherein the composite material structure has a first warp-weft ratio in the surface layer and a second warp-weft ratio, greater than the first warp-weft ratio, in the inner layer.

6. The variable pitch vane of claim 4, wherein the warp strands have a lower take-up in the inner layer than in the surface layer.

7. The variable pitch vane of claim 1, wherein the inner layer consists of a metal structure.

8. The variable pitch vane of claim 1, wherein the surface layer consists of a woven composite and the inner layer consists of a laminate of unidirectional plies whose fibers are oriented parallel to the pitch axis.

9. The variable pitch vane of claim 1, wherein the inner layer consists of a central layer extending from the pitch axis to toward the surface layer.

10. The variable pitch vane of claim 9, wherein the segment of the root comprises an intermediate layer interposed between the surface layer and the central layer, the intermediate layer having a third stiffness strictly greater than the first stiffness and strictly lower than the second stiffness.

11. The variable pitch vane of claim 9, wherein the central layer is entirely made of composite material.

12. The variable pitch vane of claim 1, wherein the segment of the root comprises an intermediate layer interposed between the surface layer and the central layer and the stiffness varies continuously at the interface between the layers and inside the intermediate layer such that the stiffness of the segment of the root increases gradually from the surface layer to the inner layer.

13. A turbomachine fan, comprising a fan hub and a plurality of the variable pitch vane of claim 1.

14. A turbomachine comprising the fan of claim 13.

15. An aircraft comprising the turbomachine of claim 14.

16. The variable pitch vane of claim 1, wherein the inner layer consists of a steel or titanium structure.

17. The variable pitch vane of claim 1, wherein the first stiffness is less than or equal to 25% of the second stiffness.

* * * * *